(12) United States Patent
Eidson

(10) Patent No.: US 7,251,199 B2
(45) Date of Patent: Jul. 31, 2007

(54) DISTRIBUTED SYSTEM TIME SYNCHRONIZATION INCLUDING A TIMING SIGNAL PATH

(75) Inventor: John C. Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 474 days.

(21) Appl. No.: 10/035,110

(22) Filed: Dec. 24, 2001

(65) Prior Publication Data

US 2003/0117899 A1  Jun. 26, 2003

(51) Int. Cl.
*G04C 11/00* (2006.01)
*G04C 11/02* (2006.01)

(52) U.S. Cl. .......................................... 368/46; 368/47

(58) Field of Classification Search ............ 368/46–48, 368/52, 53, 55, 56; 370/389, 503, 390, 507, 370/516, 369
See application file for complete search history.

(56) References Cited

U.S. PATENT DOCUMENTS

| 5,425,004 A * | 6/1995 | Staffan ........................ 368/46 |
| 5,519,726 A * | 5/1996 | DiCarlo ...................... 375/224 |
| 6,157,957 A * | 12/2000 | Berthaud ..................... 709/248 |
| 6,236,623 B1 * | 5/2001 | Read et al. ................... 368/46 |
| 6,335,931 B1 * | 1/2002 | Strong et al. ................ 370/390 |
| 6,449,291 B1 * | 9/2002 | Burns et al. ................. 370/516 |
| 6,654,356 B1 * | 11/2003 | Eidson et al. ................ 370/303 |
| 6,665,316 B1 * | 12/2003 | Eidson ........................ 370/509 |
| 6,741,952 B2 * | 5/2004 | Eidson ........................ 702/187 |

FOREIGN PATENT DOCUMENTS

| EP | 0 722 233 | 7/1996 |
| EP | 0 986 202 | 3/2000 |
| EP | 0 991 216 | 4/2000 |
| WO | WO 95/05039 | 2/1995 |
| WO | WO 01/95550 | 12/2001 |
| WO | WO0195550 A2 * | 12/2001 |

* cited by examiner

*Primary Examiner*—P. Austin Bradley
*Assistant Examiner*—Thanh S. Phan

(57) ABSTRACT

A distributed system with a timing signal path for increased precision in time synchronization among distributed system clocks. A distributed system according to the present teachings includes a master clock coupled to a timing signal path and a set of slave clocks coupled to the timing signal path. The master clock includes means for generating a timing signal on the timing signal path in response to time events associated with the master clock. The slave clocks include means for adjusting their local time in response to the timing signal received via the timing signal path.

13 Claims, 5 Drawing Sheets

DISTRIBUTED SYSTEM TIME SYNCHRONIZATION INCLUDING A TIMING SIGNAL PATH

BACKGROUND OF THE INVENTION

1. Field of Invention

The present invention pertains to the field of distributed systems. More particularly, this invention relates to time synchronization among clocks in a distributed system.

2. Art Background

Distributed systems are commonly arranged as a collection of nodes which are interconnected via one or more network communication links. These network communication links may be packetized links such as Ethernet or one or more of a variety of other packetized links that are adapted to distributed control system applications.

Distributed systems commonly benefit from precise control of the timing at the distributed nodes. U.S. Pat. No. 5,566,180 of Eidson et. al. teaches a method and apparatus for providing precise control of timing in distributed nodes by synchronizing the local clocks in the distributed nodes. The synchronization protocol of Eidson et. al. involves the exchange of timing data packets and follow up packets among the nodes so that the delay in the transfer of a timing data packet from a first node to a second node in combination with timing information in a follow up packet can be used to accurately adjust a local clock in the second node.

A variety of conditions that are commonly found in distributed systems may introduce variation or jitter in the delay in the transfer of a timing data packet. For example, communication circuitry at various points in the distributed system may introduce jitter. In addition, communication circuits such as gateways can introduce jitter that depends on the volume of traffic in the system. Unfortunately, such jitter may reduce the accuracy of time synchronization in a distributed system.

SUMMARY OF THE INVENTION

A distributed system is disclosed with a timing signal path for increased precision in time synchronization among distributed system clocks. A distributed system according to the present teachings includes a master clock coupled to a timing signal path and a set of slave clocks coupled to the timing signal path. The master clock includes means for generating a timing signal on the timing signal path in response to time events associated with the master clock. The slave clocks include means for adjusting their local time in response to the timing signal received via the timing signal path. Additional timing information may be exchanged among the master and slave clocks using a network.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
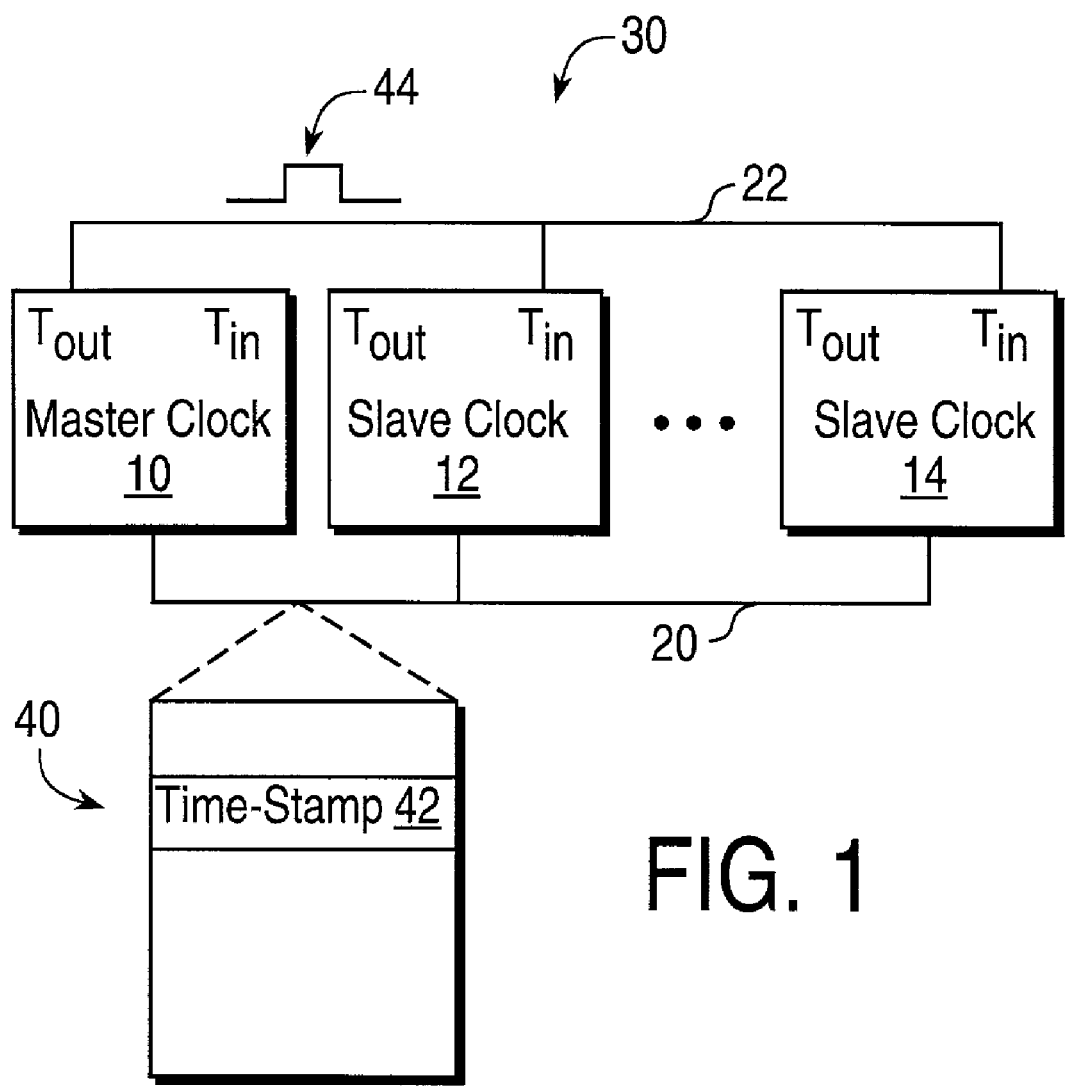
FIG. 1 shows a distributed system according to the present teachings.

FIG. 1 shows a distributed system 30 according to the present teachings. The distributed system 30 includes a master clock 10 and a set of slave clocks 12–14. The master clock 10 and the slave clocks 12–14 maintain synchronization using information transferred via a network 20 and a timing signal path 22.

The master clock 10 and the slave clocks 12–14 may be implemented as nodes that communicate via the network 20 when performing application-specific functions. The nodes that contain the master clock 10 and the slave clocks 12–14 may include hardware/software elements that perform application-specific functions associated with the distributed system 30 as well as hardware/elements for clock signal generation and time synchronization according to the present teachings.

The master clock 10 and the slave clocks 12–14 implement hardware/software elements for maintaining synchronization of their local time values by transferring timing messages via the network 20. In one embodiment, the master clock 10 and the slave clocks 12–14 perform a synchronization protocol described in U.S. Pat. No. 5,566,180 of Eidson et. al. In general, the synchronization protocol enables the selection of any of the clocks 10–14 as the master clock.

The master clock 10 via its $T_{OUT}$ port periodically issues a timing signal 44 on the timing signal path 22. The timing signal 44 is aligned to a time event associated with the master clock 10. For example, the time event may be a seconds boundary of the master clock 10. The leading edge or the trailing edge of the pulse in the timing signal 44 or the middle of the pulse in the timing signal 44 may be aligned in time with a change in the seconds value of the master clock 10. In another example, the time event may be an every other second boundary of the master clock 10. The master clock 10 generates a time-stamp when the time event occurs—for example at the seconds boundary of the master clock 10.

The slave clocks 12–14 each time stamp their receipt of the timing signal 44. For example, the slave clock 12 generates a time-stamp when the timing signal 44 is received via its corresponding $T_{IN}$ port. The time-stamp may be generated upon detection of the leading or trailing edge of the pulse in the timing signal 44 or at some other point in the timing signal as appropriate.

The master clock 10 then issues a follow-up message 40 via the network 20 that includes a time-stamp 42. The time-stamp 42 is the local time in the master clock 10 that the time event occurred in the master clock 10. Each slave clock 12–14 receives the message 40, extracts the time-stamp 42, and uses its corresponding time-stamp obtained upon receipt of the timing signal 44 along with the time-stamp 42 to adjust its local time value.

For example, the relative difference between the time-stamp 42 and the time-stamp obtained by the slave clock 12 on receipt of the timing signal 44 indicates the relative error between the local time of the master clock 10 and the local time of the slave clock 12. The slave clock 12 includes circuitry for speeding up or slowing down or reloading its local time value in response to this relative error.

In an alternative embodiment, the master clock 10 encodes the time-stamp 42 and transmits it to the slave clocks 12–14 via the timing signal path 22. Each slave clock 12–14 decodes the time-stamp 42 obtained via the timing signal path 22 and uses it in its clock adjustment calculations.

A propagation delay exists during transfer of the timing signal 44 from the master clock 10 to the slave clocks 12–14. The propagation delay to the slave clocks 12–14 may differ depending on the topology of the distributed system 30. In one embodiment, the propagation delay of the timing signal 44 is uniquely determined for each slave clock 12–14—for example through measurement or calculation. Each slave clock 12–14 performs the appropriate correction to its time synchronization calculations in response to its propagation delay.

Alternatively, each slave clock 12–14 may determine its propagation delay along the timing signal path 22 by transferring a timing signal back to the master clock 10 while the transmit and receive times of the timing signal are measured. For example, the slave clock 12 generates a timing signal and a time-stamp for the timing signal, and transfers the timing signal via the timing signal path 22. The master clock 10 receives the timing signal via the timing signal path 22, generates a time-stamp in response to the timing signal, and transmits the time-stamp via the network 20 in a message. The slave clock 12 obtains the time-stamp from the master clock 10 via the network 20 and uses it together with the time-stamp it generated on transmission of the timing signal to calculate the propagation delay from the slave clock 12 to the master clock 10.

The timing signal path 22 may be implemented with a multi-drop bus or point-to-point communication links. One example of a multi-drop bus is an RS-485 bus.

The network 20 may be a packet-based communication network such as Ethernet. Another example of a packet-based network is LonTalk which is adapted to distributed control environments.

Figure 2:
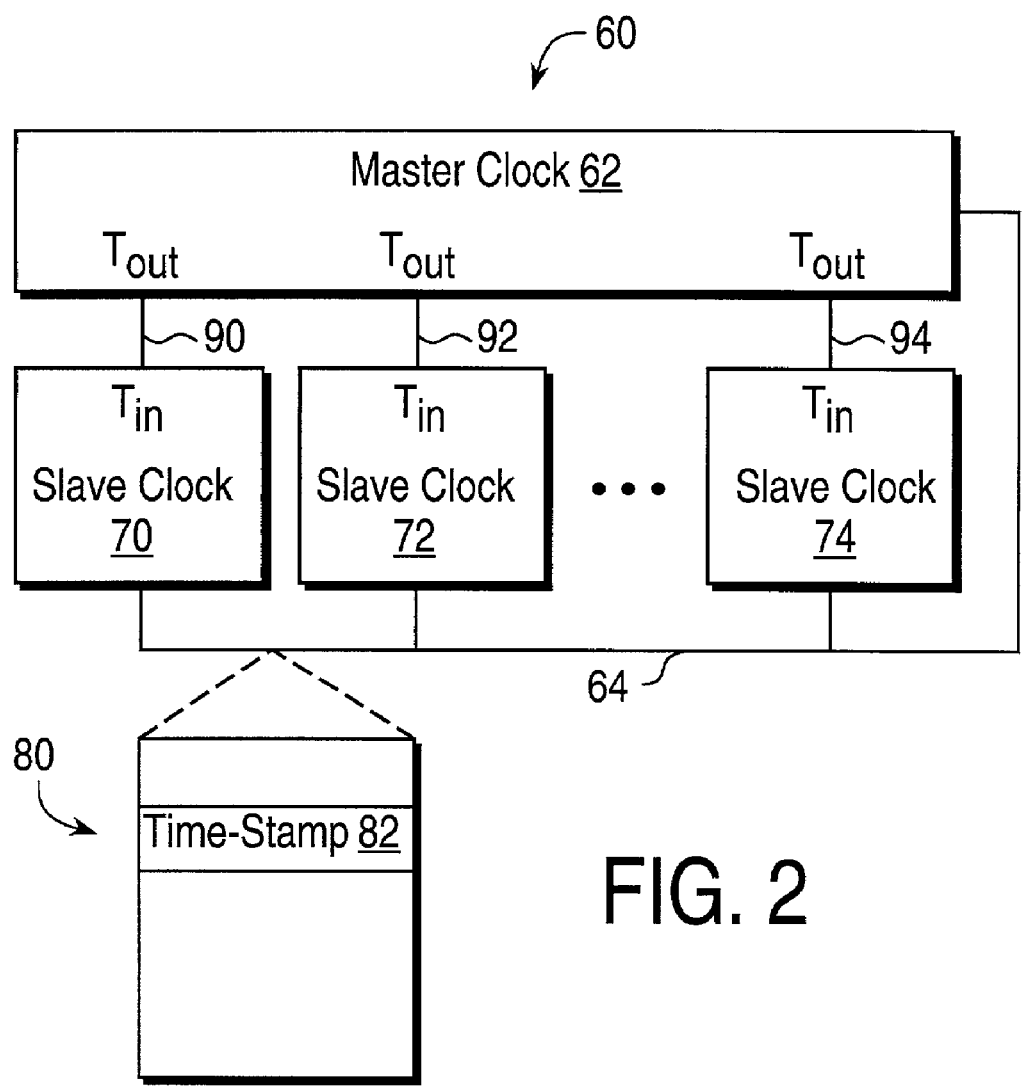
FIG. 2 shows another distributed system according to the present teachings.

FIG. 2 shows a distributed system 60 according to the present teachings. The distributed system 60 includes a master clock 62 and a set of slave clocks 70–74 which communicate via a network 64.

The master clock 62 issues a set of timing signals 90–94 to the slave clocks 70–74 via its $T_{OUT}$ ports. The timing signals 90–94 are similar to the timing signal 44, i.e. are aligned to a timing event of the master clock 62. The master clock 62 generates a time-stamp when the time event occurs. Each slave clock 70–74 generates a corresponding time-stamp when the corresponding timing signal 90–94 is received via its $T_{IN}$ port.

The master clock 62 then issues a follow-up message 80 via the network 64 that includes a time-stamp 82. The time-stamp 82 indicates the local time in the master clock 62 that the time event occurred. Each slave clock 70–74 uses its corresponding time-stamp obtained upon receipt of the corresponding timing signal 90–94 along with the time-stamp 82 to determine an adjustment to its local time value.

The master clock 62 may be synchronized to a GPS receiver (not shown) or to some other precise time source.

The ports on the slave clocks 70–74 may be similar to the ports on the slave clocks 12–14, i.e. an RS-485 port which is set in the receive mode.

The connecting cables between the $T_{OUT}$ ports of the master clock 62 and the $T_{IN}$ ports of the slave clocks 70–74 may have calibrated lengths to reduce errors caused by differing propagation delays in the timing signals 90–94. The slave clocks 70–74 may correct for propagation delays as described above.

Figure 3:
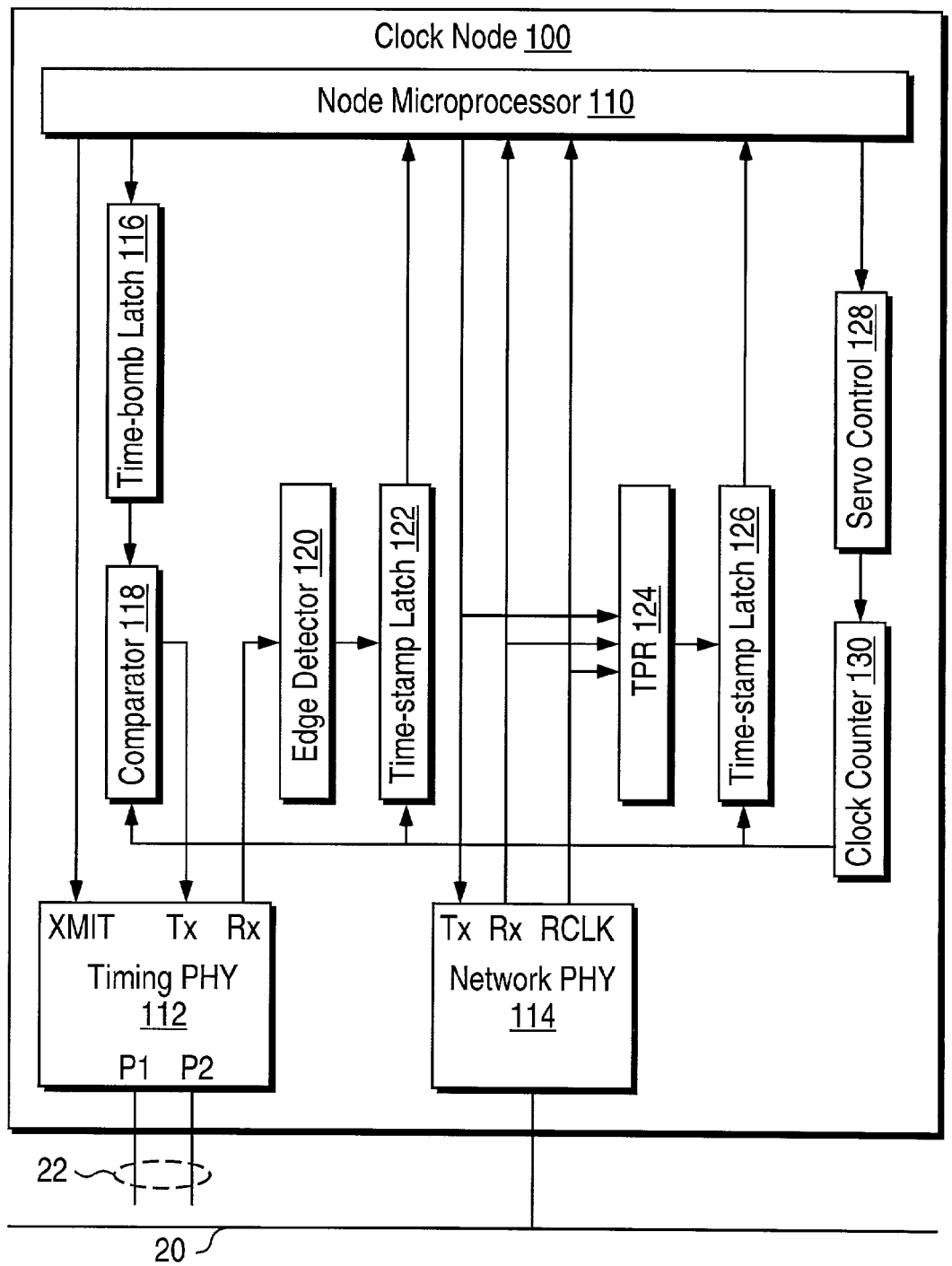
FIG. 3 shows an example implementation of a clock node which may be configured as a master clock or a slave clock.

FIG. 3 shows an example implementation of a clock node 100 which may be configured as the master clock 10 or any of the slave clocks 12–14. The clock node 100 includes a timing physical interface circuit (PHY) 112 for communication via the timing signal path 22 and a network PHY 114 for communication via the network 20. If the clock node 100 is a master clock then a node microprocessor 110 uses an XMIT signal to cause the timing PHY 112 to enter a transmit mode. If the clock node 100 is a slave clock then the node microprocessor 110 uses the XMIT signal to cause the timing PHY 112 to enter a receive mode.

In transmit (master) mode, the transmit input (Tx) to the timing PHY 112 is generated by a comparator 118. The comparator 118 compares a current local time obtained from a clock counter 130 to a time value held in a time-bomb latch 116. The time-bomb latch 116 is set by the node microprocessor 110 to generate the timing signal 44 at a desired time event—for example every other second of the clock counter 130. If the delay from the comparator 118 to the timing signal path 22 is known, for example through design or measurement, then the value in the time-bomb latch 116 may be adjusted accordingly.

Alternatively, the timing signal 44 may be derived using a gate, enabled by the node microprocessor 110, from the fractional second rollover bit or the units seconds bit, etc. of the clock counter 130.

In receive (slave) mode, the timing PHY 112 transfers a received signal (Rx) to an edge detector 120 which detects a leading or trailing edge of the timing signal 44. An edge detect signal from the edge detector 120 causes a time-stamp latch 122 to latch a local time value from the clock counter 130. A timing packet recognizer (TPR) 124 and a time-stamp latch 126 are used to detect and time stamp timing packets received via the network 20. The latched time values from the time-stamp latches 122 and 126 are provided to the node microprocessor 110 to be used in calculating corrections to be applied to the time value in the clock counter 130.

The node microprocessor 110 may detect the presence or absence of timing signals by determining whether the time stamp latch 122 is ever updated. Alternatively, the Rx signal may set a flip-flop which is read and reset by the node microprocessor 110 to detect the presence or absence of timing signals.

Figure 4:
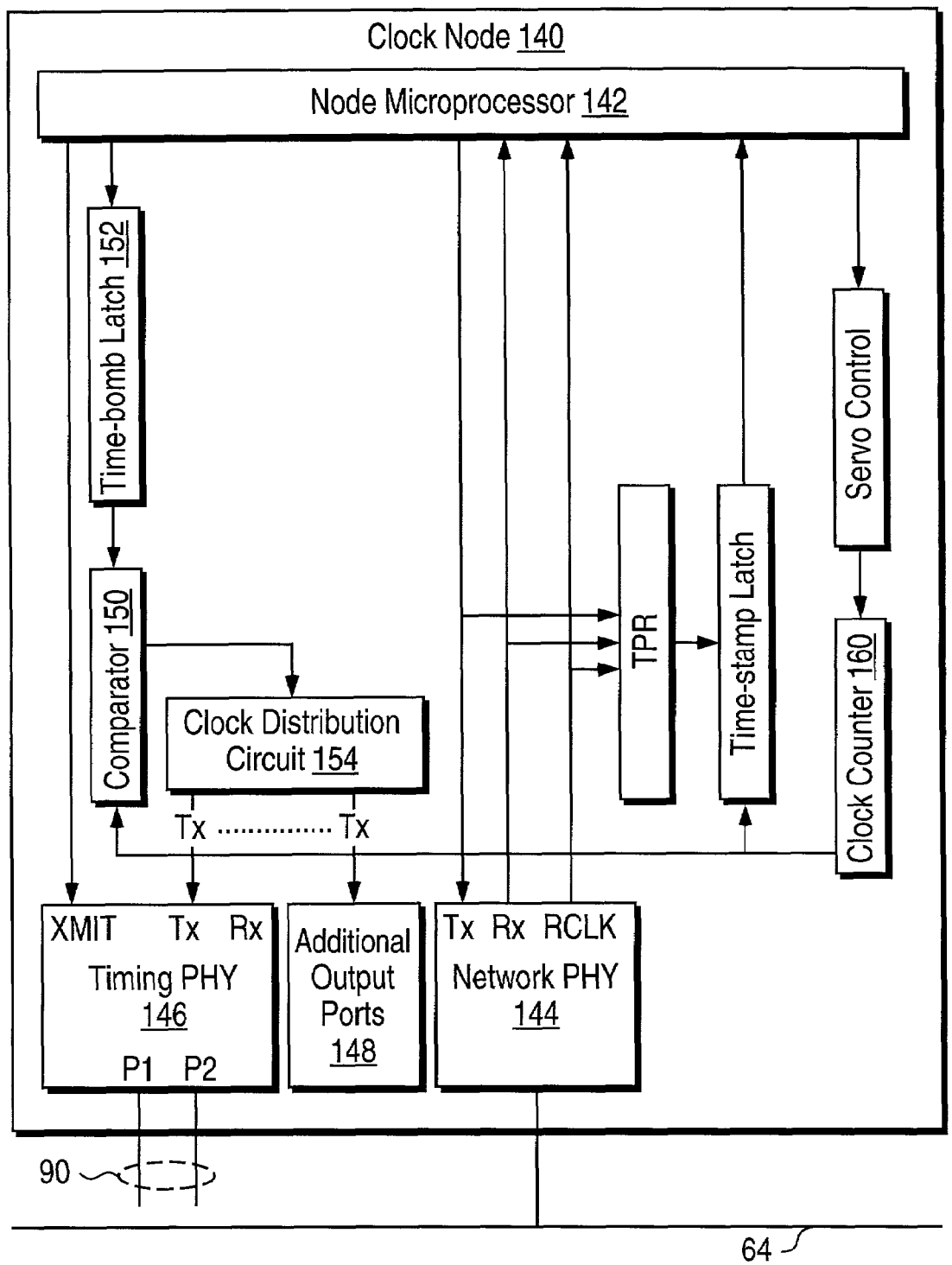
FIG. 4 shows another example implementation of a clock node which may be configured as a master clock.

FIG. 4 shows an example implementation of a clock node 140 which may be configured as the master clock 62. The clock node 140 includes a timing PHY 146 for providing the timing signal 90 to the slave clock 70 and a network PHY 144 for communication via the network 64. The clock node 140 includes a set of additional output ports 148 for providing the timing signals 92–94 to the slave clocks 72–74.

The transmit input (Tx) to the timing PHY 146 is generated by a comparator 150 which compares a current local time value obtained from a clock counter 160 to a time value held in a time-bomb latch 152. The time-bomb latch 152 is set by a node microprocessor 142 to generate the timing signals 90–94 at desired time events. The signal generated by comparator 150 that indicates a match is provided to a clock distribution circuit 154. The clock distribution circuit 154 provides multiple Tx output signals with relatively low timing skew to be distributed as the timing signals 90–94.

Figure 5:
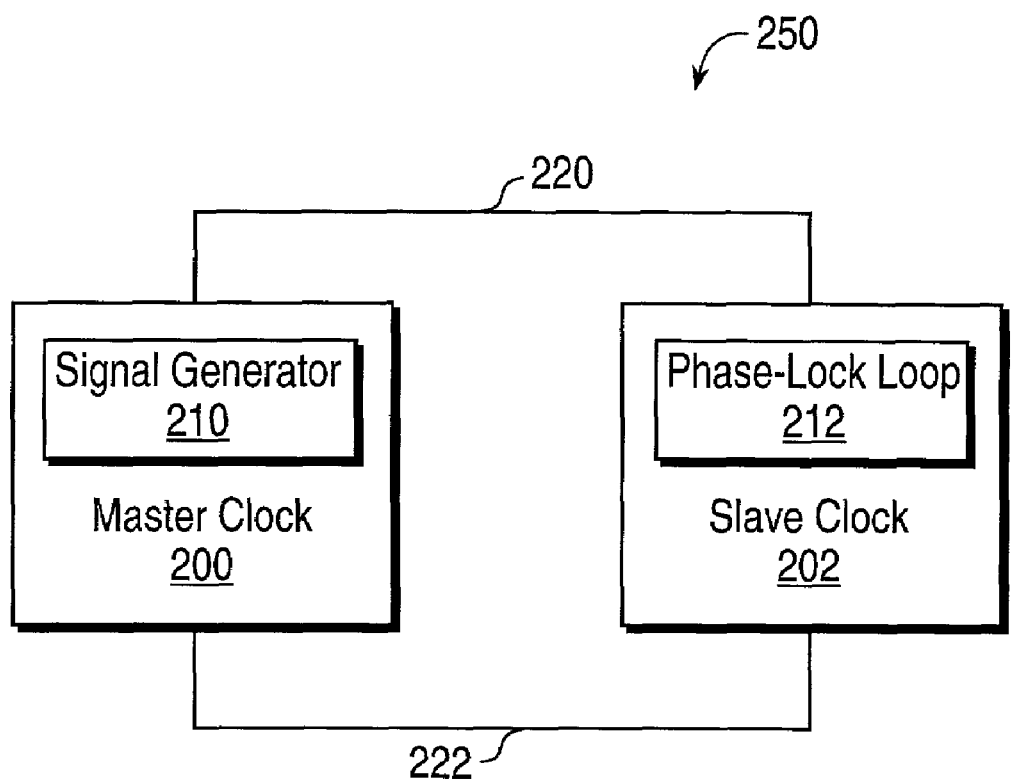
FIG. 5 shows yet another distributed system according to the present teachings.

FIG. 5 shows a distributed system 250 according to the present teachings. The distributed system 250 includes a master clock 200 and a slave clock 202. The master clock 200 includes a signal generator 210 which generates and transmits a continuous frequency timing signal to the slave clock 202 via a timing signal path 220. The timing signal path 220 may be a multi-drop bus such as RS-485 or may be a point-to-point bus.

The continuous frequency timing signal generated by the signal generator 210 may be equal to or proportional to the frequency of the master clock 200. For example, the signal generator 210 may derive a 10 MHz timing signal from a local oscillator.

The slave clock 202 includes a phase lock loop circuit 212 which phase locks to the timing signal received on the timing signal path 220 to yield a local clock frequency. The phase locking of the local clock frequency in the slave clock 202 to a continuous timing signal derived from the local clock signal in the master clock 200 provides syntonization, i.e. matching frequencies, among the master clock 200 and the slave clock 202. The timing signal path 220 may be extended to other slave clocks in the distributed system 250 having phase lock loop circuits.

The continuous frequency timing signal on the timing signal path 220 may include a normal pattern for phase locking and a periodic distinguished pattern that indicates a time event in the master clock 200—for example one second boundaries of the master clock 200. The slave clock 202 may include bit pattern recognition circuitry for recognizing the receipt of the distinguished pattern and time-stamp circuitry for time stamping the receipt of the distinguished pattern. The master clock 200 may send a follow-up message via a network 222 that includes a time-stamp indicating the local time in the master clock 200 of transmission of the distinguished pattern. The slave node 202 uses the time-stamps to determine corrections to its local time in a manner previously described.

In one embodiment, the continuous frequency timing signal is Manchester encoded in which the normal pattern is alternating ones and zeros and the distinguished pattern is two consecutive ones.

In some embodiments, the time-stamp that would otherwise be sent to the slave clock 202 via the network 222 may instead be encoded and transmitted to the slave clock 202 via the timing signal path 220. The time-stamp may be, for example, the UTC time in terms of the master clock 200 of the time event corresponding to the distinguished pattern. The slave clock 202 includes circuitry for decoding the received time-stamp.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:
   network;
   timing signal path separate from the network;
   master clock having means for transferring a timing signal on the timing signal path in response to a time event associated with the master clock and means for transferring a time-stamp via the network in response to the time event;
   slave clock having means for receiving the timing signal via the timing signal path and means for receiving the time-stamp via the network and having means for adjusting a local time in the slave clock in response to the timing signal and the time-stamp.

2. The distributed system of claim 1, wherein the timing signal comprises at least one signal pulse which is aligned to the time event.

3. The distributed system of claim 1, wherein the means for adjusting includes means for generating a time-stamp in response to the timing signal.

4. The distributed system of claim 3, wherein the time-stamp from the master clock indicates a local time in the master clock.

5. The distributed system of claim 4, wherein the means for adjusting further comprises means for determining a correction to the local time in the slave clock in response to the time-stamps.

6. The distributed system of claim 1, wherein the timing signal comprises a continuous frequency signal.

7. The distributed system of claim 6, wherein the continuous frequency signal includes a distinguished pattern which is aligned to the time event.

8. The distributed system of claim 7, wherein the means for adjusting includes means for generating a time-stamp in response to the distinguished pattern.

9. The distributed system of claim 7, wherein the means for adjusting further includes means for obtaining a time-stamp from the master clock that indicates a local time in the master clock.

10. The distributed system of claim 9, wherein the means for obtaining comprises means for obtaining the time-stamp via the network.

11. The distributed system of claim 9, wherein the means for obtaining comprises means for obtaining the time-stamp via the timing signal path.

12. The distributed system of claim 11, wherein the time-stamp from the master clock is encoded in the continuous frequency signal.

13. The distributed system of claim 11, wherein the means for adjusting further comprises means for determining a correction to the local time in the slave clock in response to the time-stamps.

* * * * *

UNITED STATES PATENT AND TRADEMARK OFFICE
CERTIFICATE OF CORRECTION

| | |
|---|---|
| PATENT NO. | : 7,251,199 B2 |
| APPLICATION NO. | : 10/035110 |
| DATED | : July 31, 2007 |
| INVENTOR(S) | : Eidson |

Page 1 of 1

It is certified that error appears in the above-identified patent and that said Letters Patent is hereby corrected as shown below:

In column 6, line 49, in Claim 13, delete "claim 11," and insert -- Claim 9 --, therefor.

Signed and Sealed this

Fourth Day of December, 2007

JON W. DUDAS
*Director of the United States Patent and Trademark Office*